United States Patent [19]

Riley

[11] Patent Number: 4,823,356
[45] Date of Patent: Apr. 18, 1989

[54] CAPILLARY BORE TUBE SUPPORT STRUCTURE

[75] Inventor: David C. Riley, Eugene Lane, Oreg.

[73] Assignee: Spectra-Physics, Inc., San Jose, Calif.

[21] Appl. No.: 85,638

[22] Filed: Aug. 13, 1987

[51] Int. Cl.$^4$ .............................................. H01S 3/03
[52] U.S. Cl. ..................................... 372/65; 372/61
[58] Field of Search ........................... 372/61, 65, 107

[56] References Cited

U.S. PATENT DOCUMENTS

| | | | |
|---|---|---|---|
| 3,784,927 | 1/1974 | Rudolph | 372/65 |
| 3,875,530 | 4/1975 | Manoukian | 372/65 |
| 4,203,080 | 5/1980 | Wright et al. | 372/107 |
| 4,644,554 | 2/1987 | Sheng | 372/61 |

Primary Examiner—William L. Sikes
Assistant Examiner—B. Randolph Holloway
Attorney, Agent, or Firm—Killworth, Gottman Hagan & Schaeff

[57] ABSTRACT

A bore tube free end support structure is positioned between an outer cylindrical envelope and an inner capillary bore tube of a laser. The support structure has outer and inner pluralities of circumferentially-spaced spring fingers integrally connected to and extending from respective outer and inner peripheries of a solid annular disc-like middle portion thereof. The outer spring fingers are alternately bent in opposite directions. The outer end of each outer spring finger defines a pair of pointed corners adapted to dig into the inside surface of the glass outer envelope of the laser, so as to anchor the support structure firmly in position with respect thereto. The inner spring fingers all extend in the same direction and each is arcuate-shaped in a longitudinal section therethrough. The inner spring fingers are thus adapted to engage the outside surface of the bore tube in a frictional sliding contacting relationship which allows longitudinal shifting but restrains transverse shifting of the bore tube relative to the outer envelope and a central axis of the laser.

7 Claims, 2 Drawing Sheets

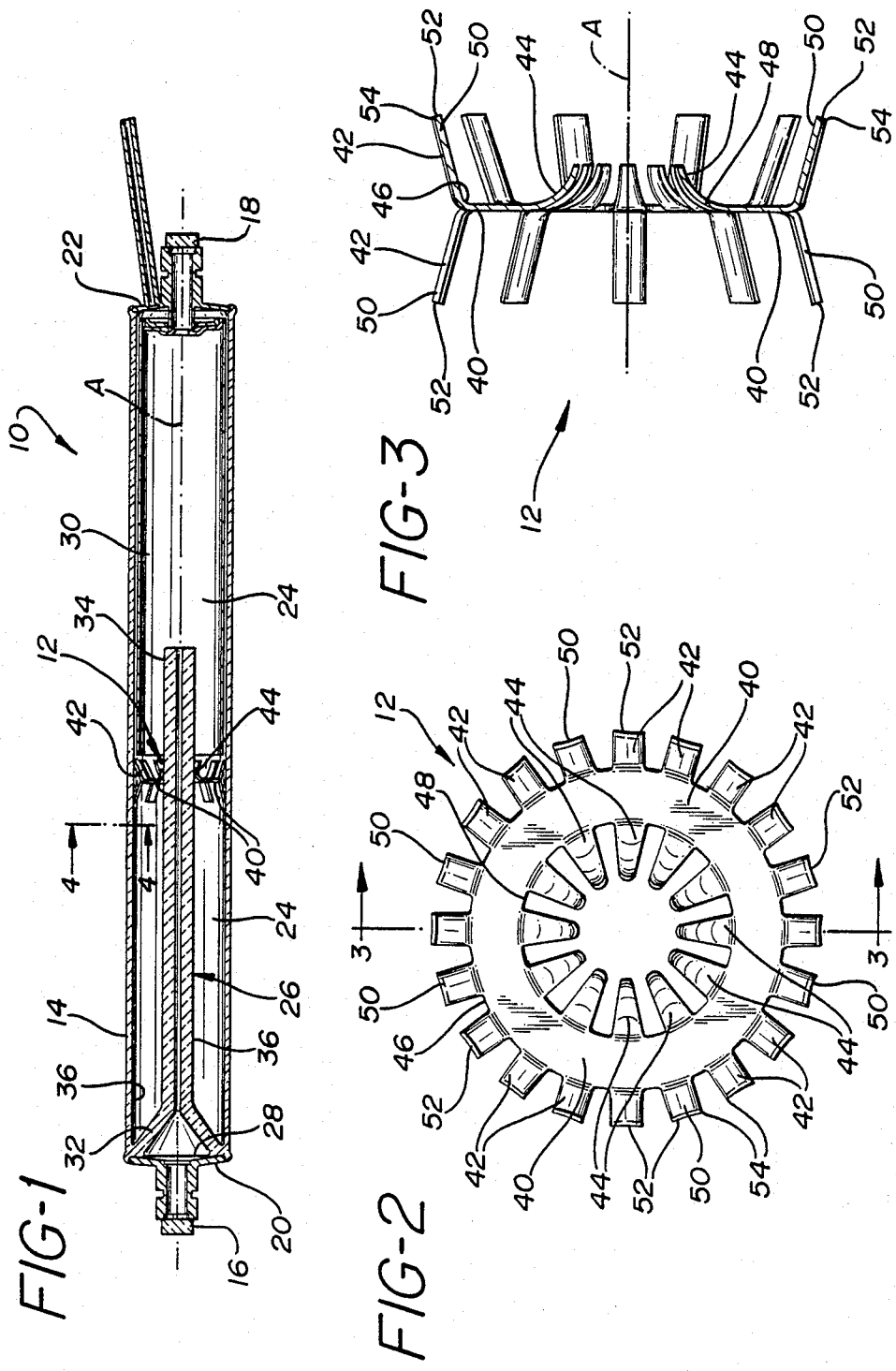

CAPILLARY BORE TUBE SUPPORT STRUCTURE

BACKGROUND OF THE INVENTION

The present invention generally relates to a laser of the type in which a cantilevered capillary bore tube is used to maximize laser power output and, more particularly, to a structure for supporting the free end of the cantilevered tube in an improved manner.

Gas lasers, such as of the helium-neon type disclosed in U.S. Pat. No. 4,644,554 to Sheng and assigned to the assignee of the present invention, typically have a sealed outer cylindrical envelope with two reflective mirrors located at opposite ends thereof. The mirrors are positioned to face each other along a central axis and define an optical resonant cavity therebetween. A capillary bore tube placed in the cavity is used to confine the discharge between an anode and cathode in the outer envelope to maximize laser power output. The bore tube is centrally mounted in cantilevered fashion within the outer envelope in axial alignment with the central axis of the mirrors. In particular, one end of the capillary bore tube is fixedly attached to one end of the outer envelope, whereas the other end of the bore tube is a free end, unsupported directly by the envelope.

During operation of the laser, the capillary bore tube is heated to a substantially higher temperature than the temperature reached by the outer envelope. Since the bore tube is subjected to a higher temperature than the outer envelope, the length of the bore tube increases at a greater rate than the length of the outer envelope. The free end of the bore tube must therefore be permitted to shift longitudinally with respect to the outer envelope in alignment with the central axis to accommodate this difference in thermal expansion.

However, transverse or radial shifting of the free end of the bore tube relative to the central axis of the mirrors and cavity defined therebetween is highly undesirable. Transverse bore tube shifting may result in clipping of a portion of the laser beam and thereby reduce the power output of the laser. It is, therefore, mandatory to provide some means to support the bore tube so as to allow axial longitudinal shifting thereof relative to the outer envelope, but restrain transverse or radial shifting thereof relative to the central axis of the mirrors and thus to the laser beam.

The above-cited Sheng patent discusses several flexible, spring-type spider constructions designed heretofore to provide the means for supporting the bore tube free end. In both of the constructions, the spiders extend between and engage the inside surface of the outer envelope and the outside surface of the bore tube to position the free end transversely within the cavity. However, in one construction the spider is not rigidly attached to the envelope and bore tube to permit the free end of the tube to slide longitudinally within the spider, whereas in the other construction the spider is rigidly attached to the inside surface of the outer envelope and the outside surface of the bore tube but can flex sufficiently to accommodate longitudinal movement of the free end of the tube.

Both constructions have certain drawbacks. The disadvantage of the first construction is that the spider has insufficient transverse rigidity to support relatively high shock loads and vibrations and thereby restrain radial misalignment of the bore tube with the central axis. The disadvantage of the second construction is that the spider can still become detached at certain parts thereof from one or the other of the outer envelope or inner bore tube when sufficiently vibrated, causing misalignment with the central axis upon longitudinal shifting of the bore tube. In both instances, misalignment with the central axis and thereby with the laser beam results in a reduction of the power output of the laser.

Consequently, in view of the above-noted difficulties, as well as others with the spring-like spider constructions of the prior art, it is readily apparent that a need still remains for a structure which supports the capillary bore tube within the laser outer envelope both longitudinally and transversely in the desired manner.

SUMMARY OF THE INVENTION

The present invention provides a cantilevered capillary bore tube support structure designed to satisfy the aforementioned needs. The bore tube support structure of the present invention avoids the problem of prior art spider constructions by utilizing an outer plurality of circumferentially-spaced spring fingers which are alternately bent in opposite directions. Further, the outer spring fingers each have a slightly curved end shape. When the outer envelope made of glass is heated to an elevated temperature during a processing step in the manufacture of the laser following insertion of the support structure into position within the outer envelope, the glass softens slightly and the pointed corners of the curved ends of the outer spring fingers dig into the inside surface of the glass outer envelope by a few mils, anchoring the support structure firmly in position with respect to the outer envelope.

The support structure also utilizes an inner plurality of arcuate-shaped circumferentially-spaced spring fingers which extend in a common direction and engage the outside surface of the bore tube in a frictional sliding contacting relationship which allow longitudinal shifting but restrain transverse shifting of the tube relative to the outer envelope and the central axis. Further, the support structure has a solid annular disc-like middle portion to which the outer and inner pluralities of spring fingers are integrally connected.

Accordingly, it is an object of the present invention to provide a support structure having spring fingers which coact to support the free end of a laser bore tube in the desired manner both longitudinally and transversely with respect to a laser outer envelope; to provide a support structure having an outer plurality of alternating circumferentially-spaced spring fingers which provide symmetry and proper orientation for positioning the support structure within the outer envelope in alignment with the central axis of the laser; to provide such outer spring fingers with curved ends having pointed corner tips which dig into the glass of the outer envelope to firmly anchor the support structure thereto; and to provide a support structure having an inner plurality of circumferentially-spaced spring fingers extending in a common direction and engaging the outside surface of the bore tube so as to allow longitudinal shifting but restrain transverse shifting of the tube relative to the central axis.

BRIEF DESCRIPTION OF THE DRAWINGS

FIG. 1 is a longitudinal axial cross-sectional view of a laser employing the support structure of the present invention for mounting the free end of the capillary bore tube of the laser within the outer envelope thereof;

FIG. 2 is an enlarged end elevational view of the support structure of the present invention removed from the laser;

FIG. 3 is a sectional view of the support structure taken along line 3—3 of FIG. 2;

DETAILED DESCRIPTION OF THE PREFERRED EMBODIMENT

Figure 4:
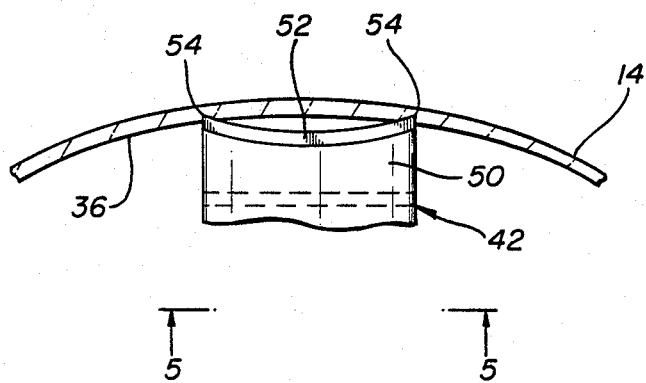
FIG. 4 is an enlarged fragmentary view of the outer envelope of the laser in sectional form and of the curved end of one of the outer spring fingers of the support structure, as seen along line 4—4 of FIG. 1, showing the pointed tips on the corners of the curved finger end digging into the glass of the laser bore tube.

Reference is made to FIG. 1 of the drawings which illustrates a laser, being generally designated 10, which incorporates the preferred embodiment of the bore tube support structure 12 of the present invention. The laser 10 includes a sealed outer cylindrical envelope 14 with two reflective mirrors 16,18 located at opposite ends 20,22 thereof. The mirrors 16,18 are positioned to face each other along a central axis A and define an optical resonant cavity 24 therebetween.

Also, the laser 10 includes a cylindrical capillary bore tube 26 placed in the cavity 24. The bore tube 26 is used to confine the discharge between an anode 28 and cathode 30 in the outer envelope 14 to maximize laser power output. The bore tube 26 is centrally mounted in cantilevered fashion within the outer envelope 14 in axial alignment with the central axis A of the mirrors 16,18. In particular, one end 32 of the bore tube 26 is fixedly attached to one end 20 of the outer envelope 14. The bore tube 26 extends therefrom in cantilever fashion along the central axis A toward the other end 22 of the outer envelope 14. The other end 34 of the bore tube 26 is spaced from the other end 22 of the outer envelope 14 and constitutes a free end, unsupported directly by the envelope.

For supporting the free end 34 of the capillary bore tube 26 in the desired manner both longitudinally and transversely with respect to the outer envelope 14 and central axis A of the laser 10, the support structure 12 of the present invention is provided. The support structure 12 is positioned adjacent the free end 34 of the bore tube 26 between an inside surface 36 of the outer cylindrical envelope 14 and an outside surface 38 of the inner bore tube 26.

Referring now to FIGS. 2 and 3, the support structure 12, preferably a stamped, metal member, includes an annular middle portion 40, an outer plurality of circumferentially-spaced spring fingers 42, and an inner plurality of circumferentially-spaced spring fingers 44. The inner fingers 44 are spaced radially inward toward the central axis 4 and differ in configuration from the outer fingers 42.

More particularly, the annular middle portion 40 of the support structure 12 is in the form of a solid, planar, disc-like portion having outer and inner peripheries 46,48. The outer spring fingers 42 are integrally connected to and extend from the outer periphery 46 of the middle portion 40, while the inner spring fingers 44 are integrally connected to and extend from the inner periphery 48 thereof. Whereas the outer spring fingers 42 are alternately bent to extend in opposite directions from the plane of the middle portion 40, the inner spring fingers 44 are all bent from the plane of the middle portion 40 in the same direction. The plane of the middle portion 40 is generally transverse to the central axis A, whereas the fingers 42,44 make a shallow acute angle with respect thereto.

Figure 5:
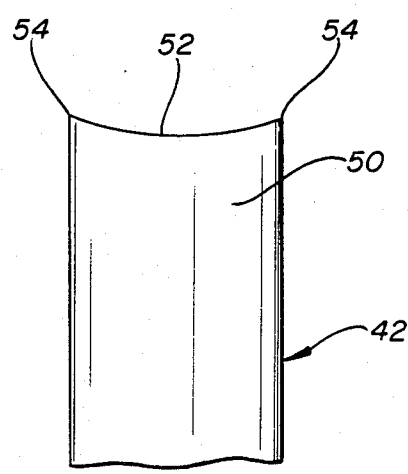
FIG. 5 is a bottom plan view of the curved end of the outer spring finger of the support structure, as seen along line 5—5 of FIG. 4.

As illustrated in FIGS. 4 and 5, each outer spring finger 42 has an outer end 50 which is curved-shaped at its terminal edge 52. The curved-shaped terminal edge 52 defines a pair of pointed corners 54. The outer envelope 14, preferably made of glass, is heated to an elevated temperature, for instance approximately 485 degrees C., during a processing step in the manufacture of the laser 10 following insertion of the support structure 12 into position within the outer envelope 14. Such heating softens the glass slightly. The pointed corners 54 of the curved outer ends 50 then pierce or dig into the softened inside surface 36 of the glass outer envelope 14 by a few mils, anchoring the support structure 12 firmly in position with respect to and along the inside surface 36 of the outer envelope 14. The alternating design of the outer spring fingers 42 provides the support structure 12 with a symmetry and orientation which facilitates accurate alignment thereof with the central axis A of the laser 10.

In addition, as seen in FIG. 2, each of the inner spring fingers 44 is arcuate-shaped in a longitudinal section therethrough, adapting the inner fingers to engage the outside surface 38 of the bore tube 26 in a frictional, sliding contacting relationship which allows longitudinal shifting but restrains transverse shifting of the bore tube 26 relative to the outer envelope 14 and the central axis A of the laser 10. By such arrangement, the outer and inner spring fingers 42,44 of the support structure 12 along with the disc-shaped middle portion 40 thereof coact to support the free end 34 of the capillary bore tube 26 in the desired manner, both longitudinally and transversely with respect to the outer envelope 14 and the central axis A of the laser 10.

Having thus described the bore tube support structure of the present invention in detail and by reference to a preferred embodiment thereof, it will be apparent that modifications and variations are possible without departing from the scope of the invention defined in the appended claims.

What is claimed is:

1. A laser capillary bore tube support structure, comprising:
   an annular middle portion having outer and inner peripheries;
   an outer plurality of circumferentially-spaced spring fingers intergrally connected to and extending from said outer periphery of said middle portion, said outer spring fingers being alternately bent in opposite directions, each of said outer spring fingers having an outer end arranged to contact the inside surface of a glass outer envelope of a laser, and said outer end of each outer spring finger being curved at a terminal edge thereof to define a pair of pointed corners, said pointed corners being sufficiently sharp such that said corners dig into the inside surface of a glass outer envelope of a laser when said support structure is positioned therein so as to anchor the support structure thereto; and
   an inner plurality of circumferentially-spaced spring fingers integrally connected to and extending from said inner periphery of said middle portion.

2. The support structure of claim 1 in which said inner spring fingers all extend in the same direction.

3. The support structure of claim 1 in which each of said inner spring fingers is arcuate-shaped in a longitudinal section therethrough, said inner fingers, when said support structure is positioned between an outer cylindrical envelope and an inner capillary bore tube of a laser, engaging the outside surface of the bore tube in a frictional sliding contacting relationship which allows longitudinal shifting but restrains transverse shifting of the bore tube relative to the outer envelope of the laser.

4. In a laser including an outer cylindrical envelope having an inside surface and a pair of opposite ends, a pair of reflecting mirrors disposed at said respective opposite ends of said envelope and defining a central axis of an optical cavity therebetween, and an inner capillary bore tube disposed within said envelope and having an outside surface spaced inwardly from said inside surface of said envelope, said inner capillary bore tube being attached to one end of said envelope and extending in cantilever fashion therefrom toward the outer end of said envelope and terminating at a free end spaced from said other envelope end, a bore tube free end support structure positioned between said outer envelope and said inner bore tube adjacent said free end thereof, said support structure comprising:

an annular middle portion having outer and inner peripheries:

an outer plurality of circumferentially-spaced spring fingers integrally connected to and extending from said outer periphery of said middle portion to said inside surface of said envelope, said outer spring fingers being alternately bent in opposite directions, each of said outer fingers having means defined on the outer end thereof for anchoring to said inside surface of said outer envelope, said means on said outer end of each of said outer spring fingers includes a curve-shaped terminal edge and a pair of pointed corners which engage and dig into said inside surface of said outer envelope; and inner means integrally connected to and extending from said inner periphery of said middle portion for slidably engaging said outer surface of said bore tube.

5. The support structure of claim 4 in which said inner means comprises an inner plurality of circumferentially-spaced spring fingers, positioned radially inwardly from said outer spring fingers.

6. The support structure of claim 5 in which said inner spring fingers all extend in the same direction.

7. The support structure of claim 5 in which each of said inner spring fingers is arcuate-shaped in longitudinal section therethrough, said inner fingers engaging said outside surface of said bore tube in a frictional sliding contacting relationship which allows longitudinal shifting but restrains transverse shifting of said bore tube relative to said outer envelope of the laser, whereby, in such arrangement, said outer and inner spring fingers of the support structure along with the disc-shaped middle portion thereof coact to support said free end of said capillary bore tube in the desired manner both longitudinally and transversely with respect to said outer envelope of said laser.

* * * * *